United States Patent
Yamamoto

(10) Patent No.: US 8,057,353 B2
(45) Date of Patent: Nov. 15, 2011

(54) FRICTIONAL DRIVE TRANSMISSION

(75) Inventor: Takeshi Yamamoto, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 960 days.

(21) Appl. No.: 12/022,645

(22) Filed: Jan. 30, 2008

(65) Prior Publication Data

US 2008/0220931 A1   Sep. 11, 2008

(30) Foreign Application Priority Data

Mar. 7, 2007   (JP) .................................. 2007-056481

(51) Int. Cl.
*F16H 13/04*   (2006.01)
(52) U.S. Cl. ............................... 476/59; 476/65; 476/70
(58) Field of Classification Search .................... 476/59, 476/61, 70, 65, 66
See application file for complete search history.

(56) References Cited

U.S. PATENT DOCUMENTS

| 2005/0143211 A1 | 6/2005 | Yamamoto |
| 2007/0296308 A1 | 12/2007 | Yamamoto |

FOREIGN PATENT DOCUMENTS

| EP | 1808617 A1 | 7/2007 |
| JP | 2005-256950 A | 9/2005 |
| WO | WO-2007/010364 A2 | 1/2007 |

*Primary Examiner* — William C Joyce
(74) *Attorney, Agent, or Firm* — Global IP Counselors, LLP

(57) ABSTRACT

A frictional drive transmission basically comprises a transmission case, a drive roller unit, a driven roller unit, a gear shifting mechanism and an elastic member. Each of the roller units has a plurality of rollers with each of the driven rollers being associated with a corresponding one of the drive rollers to form roller pairs. The gear shifting mechanism is operatively coupled to one of the roller units to selectively contact one of the roller pairs together to form a contacting roller pair. A cam-shaped support member is provided with a mounting surface and a cam slanted surface such that contact surfaces thereof forms an angle smaller than forty-five degrees with respect to the mounting surface. The elastic member is arranged between the transmission case and the mounting surface of the cam-shaped support member to apply a pressing force in a contact direction of a contacting roller pair.

9 Claims, 8 Drawing Sheets

FRICTIONAL DRIVE TRANSMISSION

CROSS-REFERENCE TO RELATED APPLICATIONS

This application claims priority to Japanese Patent Application No. 2007-056481, filed on Mar. 7, 2007. The entire disclosure of Japanese Patent Application No. 2007-056481 is hereby incorporated herein by reference.

BACKGROUND OF THE INVENTION

1. Field of the Invention

The present invention generally relates to frictional drive transmissions that use a plurality of friction transmitting roller pairs. More specifically, the present invention relates to a frictional drive transmission that has a gear shifting mechanism for selectively switching between friction transmitting roller pairs.

2. Background Information

An existing frictional drive transmission employs a structure in which a cam is slid in a direction perpendicular to a pressing force acting against the contacting surfaces of two contacting rollers in order to simplify the assembly of the frictional drive transmission and simplify the adjustment of the applied pressure. More specifically, an elastic member configured and arranged to elongate and contract in the direction perpendicular to the pressing force is provided between the cam and a frame such that the applied pressure can be adjusted with a low-accuracy positioning part (e.g., Japanese Laid-Open Patent Publication No. 2005-256950).

In view of the above, it will be apparent to those skilled in the art from this disclosure that there exists a need for an improved frictional drive transmission. This invention addresses this need in the art as well as other needs, which will become apparent to those skilled in the art from this disclosure.

SUMMARY OF THE INVENTION

It has been discovered that with the frictional drive transmission described above, the applied pressure can be adjusted appropriately when there is only one pair of rollers, i.e., a drive roller and a driven roller. However, when there are two or more roller pairs and the frictional drive transmission is contrived to selectively put one pair of rollers into pressing contact at a time, the applied pressure can only be adjusted for one gear position (i.e., one roller pair). Consequently, there are cases in which the applied pressure is not obtained for the other roller pairs due to such factors as error of the roller diameter.

If the roller diameter of a pair of rollers is on the order of several tens of millimeters, then there will be a dimensional error of several tens of micrometers in the external diameter of each roller and in the internal gaps of the bearings. Thus, the error of the distance between the center axes of the two rollers will be approximately 50 to 100 micrometers. Since the rollers are typically made of steel or another material having a high Young's modulus, the aforementioned error between the center axes can cause the applied pressure load to be several times larger than the desired value or, conversely, cause the rollers not to touch.

With the technology described above, although the cam is arranged such that it can slide with respect to the frame, the cam slanted surface shown in the figure is slanted at an angle smaller than 45 degrees with respect to the horizontal direction of the figure (as will be explained in the embodiments, the slanted surface is actually slanted several degrees with respect to the horizontal direction in the figure). Consequently, the pressing force acting at the contact point between the rollers is a larger load than the transmitted force. Additionally, since the surfaces of the cam and the frame that slide directly against each other are both made of metal, the friction force is large and it is difficult to change the position of the cam when adjusting the applied pressure load or assembling the rollers. As a result, the applied pressure changes greatly when the engaged roller pair is changed in order to change gears.

The present invention was conceived in view of the problems described above. One object is to provide a frictional drive transmission in which the applied pressure load between the rollers of all of the roller pairs can be set to an appropriate value regardless of variations in the distance between the center axes of the rollers resulting from dimensional error and the like.

In order to achieve the aforementioned object, a frictional transmission is provided that basically comprises a transmission case, a drive roller unit, a driven roller unit, a gear shifting mechanism and an elastic member. The transmission case includes a first support member and a second support member. The drive roller unit includes a plurality of drive rollers having different diameters, with the drive rollers being rotatably supported on the transmission case by the first support member. The driven roller unit includes a plurality of driven rollers having different diameters, with the driven rollers being rotatably supported on the transmission case by the second support member and each of the driven rollers being associated with a corresponding one of the drive rollers to form a plurality of roller pairs. The gear shifting mechanism is operatively coupled to one of the drive and driven roller units to selectively contact one of the roller pairs together to form a contacting roller pair. At least one of the first and second support members includes a roller shaft support member and a cam-shaped support structure. The roller shaft support member supports a shaft of one of the drive and driven roller units. The cam-shaped support structure has a cam slanted surface and a mounting surface. The cam slanted surface is slanted with respect to a contact direction of the contacting roller pair to contact the roller shaft support member such that a pushing force is developed in the contact direction between the contacting roller pair. The mounting surface is arranged at an angle smaller than forty-five degrees with respect to the cam slanted surface. The elastic member is arranged between the transmission case and the mounting surface to apply the pushing force in the contact direction of the contacting roller pair.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
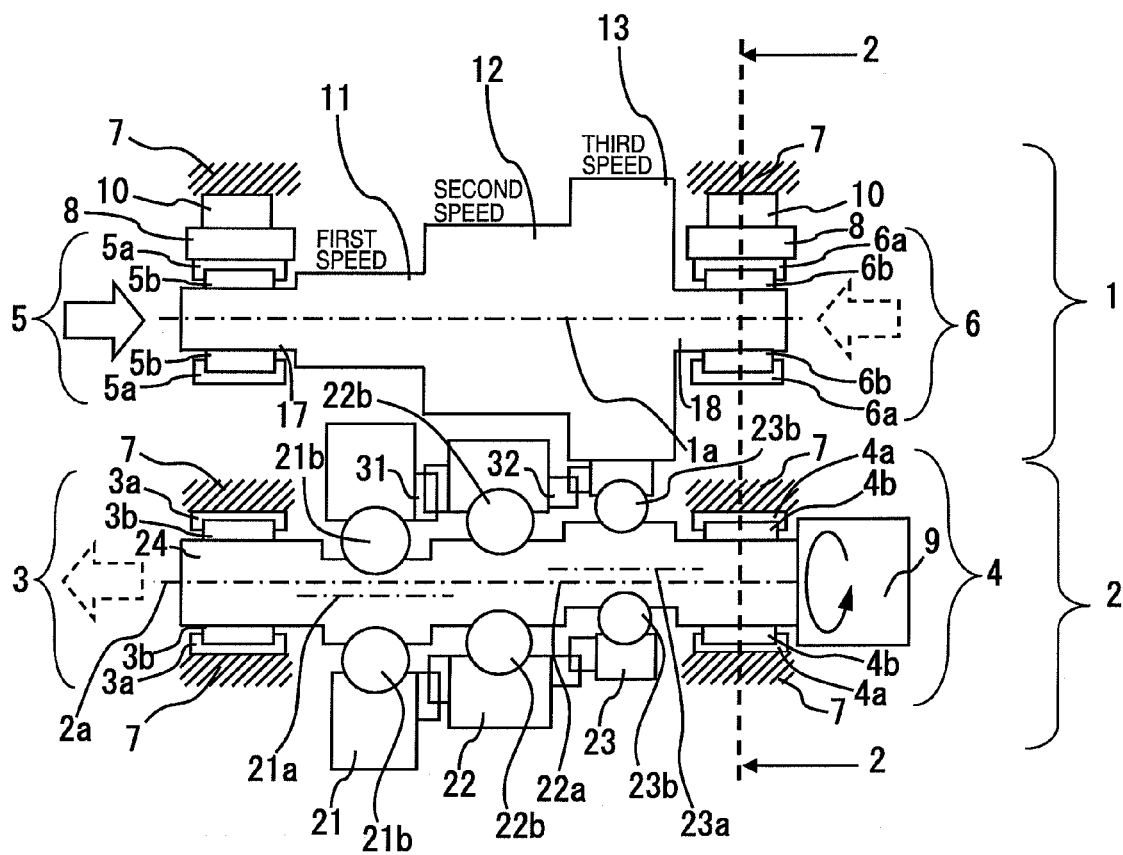
FIG. 1 is a simplified schematic diagram of an entire frictional drive transmission in accordance with a first embodiment having three forward speeds and one reverse speed.

Referring initially to FIG. 1, a frictional drive transmission is illustrated in accordance with a first embodiment. The main features of the first embodiment will now be explained. FIG. 1 shows an entire frictional drive transmission in accordance with a first embodiment. The frictional drive transmission has three forward speeds and one reverse speed. The frictional drive transmission is configured to be provided in a drive train of a vehicle. The frictional drive transmission includes a drive roller unit 1 and a driven roller unit 2 that are supported in a freely rotatable manner. The frictional drive transmission is arranged to press the drive roller unit 1 and the driven roller unit 2 against each other such that a friction force develops at the portion where the roller units 1 and 2 contact each other. The friction force serves to transmit power from one of the roller units 1 or 2 to the other roller unit 2 or 1.

The drive roller unit 1 basically includes a first speed drive roller 11, a second speed drive roller 12, a third speed drive roller 13 and a pair of drive roller support shaft sections 17 and 18. The rollers 11, 12 and 13 and the drive roller support shaft sections 17 and 18 are preferably all formed together as a one-piece integral unit. The diameters of the drive rollers 11, 12 and 13 differ such that the diameter of the first speed drive roller 11 is smaller than the diameter of the second speed drive roller 12 and the diameter of the second speed drive roller 12 is smaller than the diameter of the third speed drive roller 13. The first speed drive roller 11, the second speed drive roller 12, and the third speed drive roller 13 are arranged in order as listed from left to right (as viewed in FIG. 1) between the drive roller support shaft sections 17 and 18. The drive roller support shaft sections 17 and 18 are supported on first and second drive roller support bearings 5 and 6 that are arranged on a frame 7 at both ends of the drive roller unit 1. The frame 7 constitutes a "transmission case" for the frictional drive transmission. Each of the drive roller support bearings 5 and 6 includes a cam follower 5a or 6a that serves as an outer race and a plurality of needles 5b or 6b that serve as rolling bodies.

The driven roller unit 2 basically includes a first speed driven roller 21, a second speed driven roller 22, a third speed driven roller 23 and an eccentric driven roller shaft 24. The diameters of the driven rollers 21, 22 and 23 differ such that the diameter of the first speed driven roller 21 is larger than the diameter of the second speed driven roller 22 and the diameter of the second speed driven roller 22 is larger than the diameter of the third speed driven roller 23. The first speed driven roller 21, the second speed driven roller 22, and the third speed driven roller 23 are arranged on the eccentric driven roller shaft 24 in order as listed from left to right (as viewed in FIG. 1). The eccentric driven roller shaft 24 is supported on a first support bearing 3 and a second support bearing 4 that are arranged on the frame 7 at both ends of the eccentric driven roller shaft 24. The three driven rollers 21, 22, and 23 are mounted on the eccentric driven roller shaft 24 and configured such that three roller pairs having different gear ratios can be achieved. Each of the support bearings 3 and 4 includes an outer race 3a or 4a and a plurality of needles 3b or 4b that serve as rolling bodies.

A pressing force is applied at a contact point between each of the three pairs of rollers by setting the drive roller support bearings 5 and 6 at the drive roller support shaft sections 17 and 18 using a pair of touching cams 8. The touching cams 8 press against the drive roller support bearings 5 and 6. The touching cams 8 are mounted to the frame 7 through a pair of springs 10, respectively. Each of the drive roller support bearings 5 and 6 constitutes a "roller shaft support member". Each of the touching cams 8 constitutes a "cam-shaped support member". Each of the springs 10 constitutes an "elastic member".

Each of the cams 8 has two cam slanted surfaces 8a and 8b (see FIG. 2) that are angled with respect to the contact direction between the drive roller unit 1 and the driven roller unit 2. Depending on the rotation direction of the drive roller unit 1, either the cam slanted surfaces 8a or the cam slanted surfaces 8b contacts the cam followers 5a and 6a of the drive roller support bearings 5 and 6 so as to press the contacting roller pair together. The cam slanted surfaces 8a of the cams 8 are forward rotation cam slanted surfaces that contact the cam followers 5a and 6a and press the contacting roller pair together when a forward torque exists. The cam slanted surfaces 8b of the cams 8 are reverse rotation cam slanted surfaces that contact the cam followers 5a and 6a and press the contacting roller pair together when a reverse torque exists.

The eccentric driven roller shaft 24 is supported at both ends with the first support bearing 3 and the second support bearing 4. The three driven rollers 21, 22, and 23 are rotatably mounted on the eccentric driven roller 24 with a plurality of ball bearings 21b, 22b and 23b, respectively. A servomotor 9 is provided at one end of the eccentric driven roller shaft 24 to rotate the eccentric driven roller shaft 24. The servomotor 9 constitutes a "gear shifting mechanism". When a shift command is issued, the servomotor 9 turns the eccentric driven roller shaft 24 such that the rotational axis 21a, 22a or 23a of the driven roller unit 21, 22 or 23 corresponding to the shift position that was in effect before the shift command is moved away from the rotational axis 1a of the drive roller unit 1 and the rotational axis 21a, 22a or 23a of the driven roller unit 21, 22 or 23 corresponding to the shift position indicated by the shift command is moved toward the rotational axis 1a of the drive roller unit 1. Thus, the three roller pairs that are set to have different gear ratios can be changed (i.e., selectively engaged and disengaged).

The three roller pairs are the first speed rollers 11 and 21, the second speed rollers 12 and 22, and the third speed rollers 13 and 23. Assuming the support bearings on both ends of the driven roller unit 2 are the first support bearing 3 and the second support bearing 4, the first speed driven roller 21, the second speed driven roller 22, and the third speed driven roller 23 are arranged between the first support bearing 3 and the second support bearing 4 in order as listed starting from the side of the first support bearing 3. The driven rollers 21, 22 and 23 are connected together with a first connecting part 31 and a second connecting part 32 such that the driven rollers 21, 22 and 23 can move relative to each other in the radial direction, but not in the rotational direction. In other words, the driven rollers 21, 22 and 23 rotate as a single integral unit, but move independently to each other in the radial direction. A drive input to the frictional drive transmission is received at either one of the drive roller support shaft sections 17 and 18 and an output from the frictional drive transmission is delivered from one of the driven rollers 21, 22 and 23 in either the radial direction or the axial direction. The eccentric driven roller shaft 24 is used solely for the purpose of offsetting the center axes of the driven rollers and does not serve as an output shaft.

Figure 2:
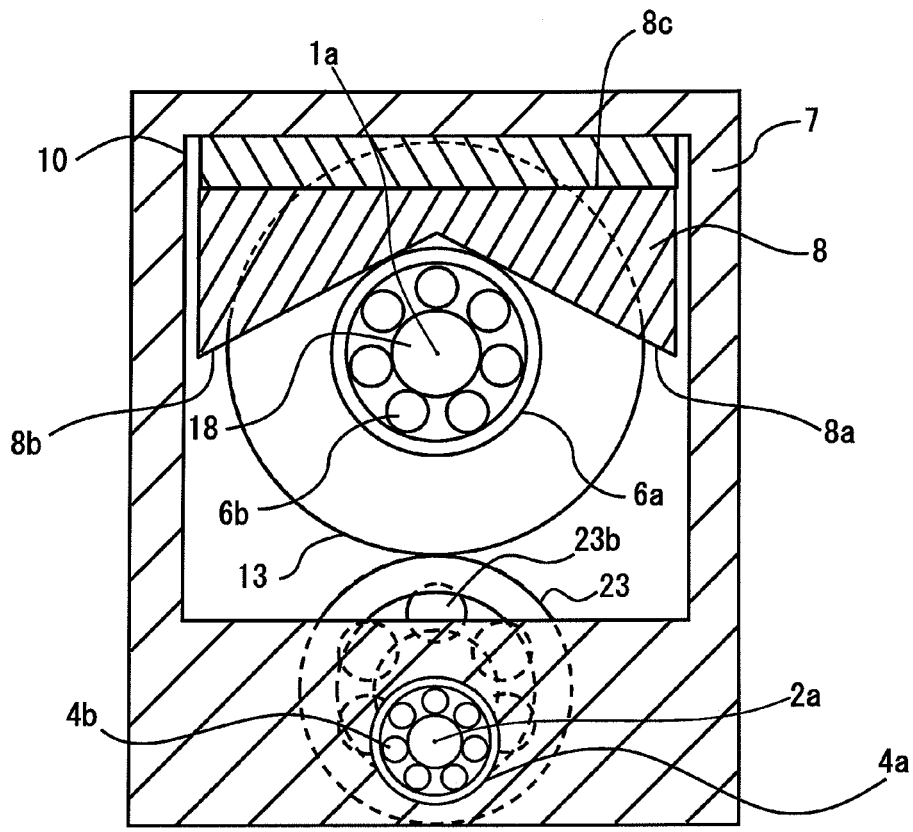
FIG. 2 is a simplified schematic cross sectional view taken along section line 2-2 of FIG. 1 to illustrate a part of the frictional drive transmission in accordance with the first embodiment.

FIG. 2 is a cross sectional view taken along the direction 2-2 and shows the main features of a frictional drive transmission in accordance with the first embodiment. In the first embodiment, the springs 10 are disposed between the frame 7 and the cams 8 along the vertical direction of the figures. The frame 7 supports the second support bearing 4 and allows movement of the cams 8 in the vertical direction while restricting movement of the cams 8 in the horizontal direction.

If the force transmitted at the contacting surfaces of the rollers (force in a tangential direction) is indicated as Fa, the force exerted by the cam slanted surfaces 8a toward the center axis 1a of the drive roller unit 1 is divided into a horizontal component Fb and a vertical component Fb tan α. The horizontal component Fb acts in a horizontal direction (i.e., horizontal in the view shown in the figure) substantially parallel to the tangential direction at the contacting surfaces of the rollers. The vertical component Fb tan α acts in a vertical direction (i.e., vertical in the view shown in the figure) substantially perpendicular to the tangential direction at the contacting surfaces of the rollers. If the coefficient of friction between the rollers is indicated as μ, then the following relationship exists due to the balance of forces: $\mu=(\approx)\tan\alpha$. Here, the term α is the angle of the cam slanted surface with respect to the horizontal direction. The tangential direction at the contacting surfaces and the horizontal direction are the coincident when the transmission is not transmitting power but slightly different when the transmission is transmitting power because the drive roller support bearing 5 turns slightly along the cam slanted surface.

In a typical frictional drive transmission that uses rollers (made of steel or other material having a high Young's modulus), the coefficient of friction of the contacting surfaces is approximately 0.1. Thus, the angle α becomes approximately five degrees based on the relationship presented above. Consequently, the vertical component force Fb tan α is ten or more times larger than the transmitted force Fa.

When the transmission is transmitting power, the diameters of the rollers change due to the pressing force acting at the contact point between the contacting roller pair, and the rollers turn along the cam slanted surfaces until the forces are balanced, thus causing the distance between the center axes of the contacting roller pair to change.

As explained previously, the slant angle of the cam slanted surface is determined based on the coefficient of friction of the rollers, and the vertical force Fb tan α exerted by the cam slanted surface against the drive roller support bearing 5 due to the transmitted force Fa increases and decreases depending on the slant angle. When the angle α is smaller than forty-five degrees, the vertical force Fb tan α is larger than the transmitted force Fa. In other words, the load at a contacting portion between the cam 8 and the frame 7 becomes larger when the contacting portion between the cam 8 and the frame 7 is slanted at an angle of forty-five degrees or less with respect to the cam slanted surface and smaller when the contacting portion between the cam 8 and the frame 7 is slanted at an angle larger than forty-five degrees with respect to the cam slanted surface. In this embodiment, since the structure is such that the slant angle α of the cam slanted surface is approximately five degrees, the load at the contact portion corresponding to the upper surface 8c of the cam 8 is large. Each of the upper surfaces 8c constitutes a "mounting surface" of the cams 8.

Therefore, in this embodiment, the springs 10 are installed between the frame 7 and the upper surface 8c of the cam 8, where the load is large. The springs 10 are arranged such that the springs 10 are in an appropriately compressed state when the applied pressure load acting between a pair of rollers is set to an initial value. From this state, if the pressing force acting at the contact point between the contacting roller pair changes, then the springs 10 can expand or contract in the vertical direction. The spring constant of the springs 10 is set to a sufficiently low value in view of rigidity caused by Hertz deformation at the contact points of the rollers.

The action of the first embodiment will now be explained. The frictional drive transmission described in Japanese Laid-open Patent Publication No. 2005-256950 (comparative example) has a forward rotation cam and a reverse rotation cam. The reverse rotation cam is fixed to the frame and the forward rotation cam is arranged on the frame such that it can slide in a substantially perpendicular direction with respect to the pressing force acting on the contacting surfaces of the rollers (i.e., slide in a horizontal direction from the perspective of the figure). A position adjusting plate and an elastic spring are installed between the forward rotation cam and the frame along the perpendicular direction (horizontal direction) and serve to adjust the pressure applied to the rollers.

In the frictional drive transmission described in this Japanese Patent publication, although the slant angle of the cam slanted surface is similar to that of this embodiment, the elastic spring is provided in a direction (horizontal direction) substantially perpendicular to the pressing direction. Thus, of the contacting portions between the cams and the frame, the spring is provided on a contacting portion where the load is small. Consequently, the load at the contacting portion where a cam contacts the frame directly is extremely large, thus causing the friction force between the cam and the frame at that contact portion to have a large effect. The cam becomes substantially unable to move with respect to the frame and the desired effect of the elastic spring, i.e., the advantage of being able to set an appropriate applied pressure load with a low-accuracy positioning part, is difficult to obtain. When the technology is used in a frictional drive transmission having a plurality of roller pairs configured such that one roller pair at a time can be selectively pressed against each other, it is difficult to move the position of the cam once the transmission has been assembled and the applied pressure load has been adjusted for one of the gear positions. Consequently, the applied pressure load fluctuates greatly when the roller pair is switched in order to change gears.

Figure 3:
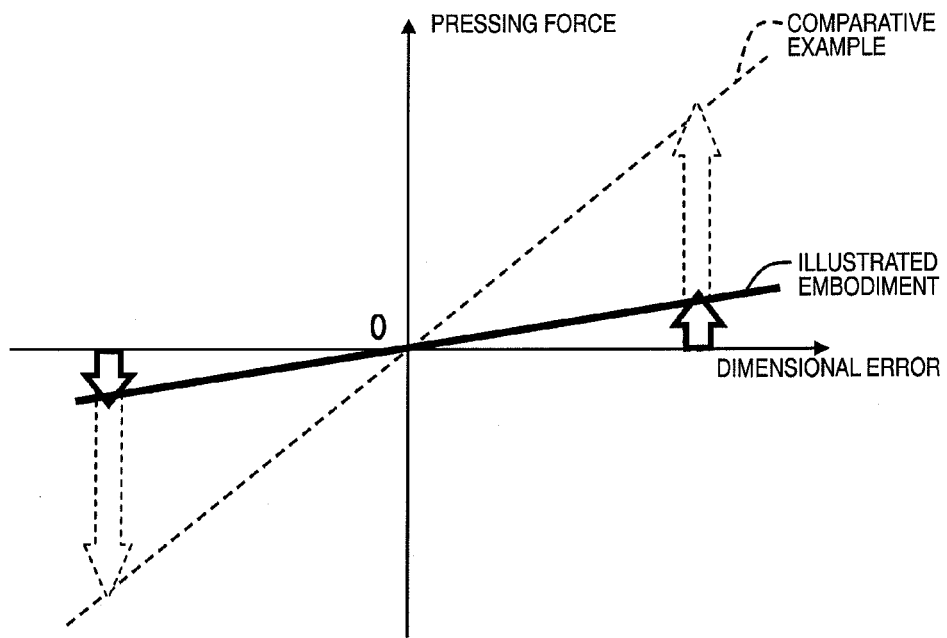
FIG. 3 is a graph that illustrates a relationship between a dimensional error and an amount of change in an applied pressure load.

Meanwhile, in the frictional drive transmission of the first embodiment, the springs 10 are provided between the mounting surface 8c of the cam 8 and the frame 7. Since the mounting surface 8c is at an angle of less than forty-five degrees with respect to the cam slanted surfaces 8a and 8b, the load increases at the contacting portion between the cam 8 and the frame 7, i.e., at the spring 10. The springs 10 serve to apply a pressing force to the contacting roller pair in the contact direction. The applied pressure load with respect to one pair of rollers (i.e., the roller pair corresponding to a particular gear position) is adjusted to an initial value. Thereafter, when the contacting roller pair is changed in order to change gears, even though the distance between the center axes of the rollers changes due to dimensional error of the roller diameters, the spring 10 expands or contracts in accordance with the distance change and the change in the applied pressure load can be absorbed. In other words, when the pressing force decreases, the springs 10 elongate and increase the pressing force. Meanwhile, when the pressing force increases, the spring 10 contract and lower the pressing force. An example is shown in FIG. 3. In FIG. 3, the vertical axis indicates the magnitude of the pressing force acting at the roller contact point (the initial value of the applied pressure is 0) and the horizontal axis indicates the dimensional error (pressing force increases in positive direction when dimension is large and increases in negative direction when dimension is small). A larger positive value on the vertical axis means the pressing force acting at the contact point between the rollers is larger than the initial value (applied pressure). A larger negative value on the vertical axis means the pressing force acting at the contact point between the rollers is smaller than the initial value (applied pressure). If the pressing force becomes too large, then the resistance to power transmission will increase and the load imposed on the component parts will increase. Conversely, if the pressing force is too small and the applied pressure becomes insufficient, then sufficient power transmission will not be obtained. In the example shown in FIG. 3, it can be seen that the load change resulting from the same dimensional error is smaller in the case of the first embodiment than in the comparative example. In other words, the efficiency with which applied pressure load variations are absorbed is much improved over the comparative example.

The effects of the first embodiment will now be explained. The frictional drive transmission in accordance with the first embodiment exhibits the following effects. The springs 10 are provided between the cam 8 and the frame 7, more specifically between the mounting surface 8c of the cam 8 and the frame 7. The mounting surface 8c is at an angle of less than forty-five degrees with respect to the cam slanted surface 8a and 8b and the springs 10 serve to apply a pressing force to the contacting roller pair in the contact direction. Thus, even if the distance between the center axes of the rollers changes due to dimensional error, the springs 10 can absorb the resulting change in the applied pressure load. As a result, the amount by which the applied pressure load changes from the initial value can be suppressed when the transmission is shifted to a gear other than the gear at which the applied pressure load was set to the initial value. Thus, the applied pressure load can be set to an appropriate value for all roller pairs. Although the explanation based on FIG. 2 only refers to the side where the drive roller support bearing 6 is located, the same constituent features exist on the side where the drive roller support bearing 5 is located.

Second Embodiment

Figure 4:
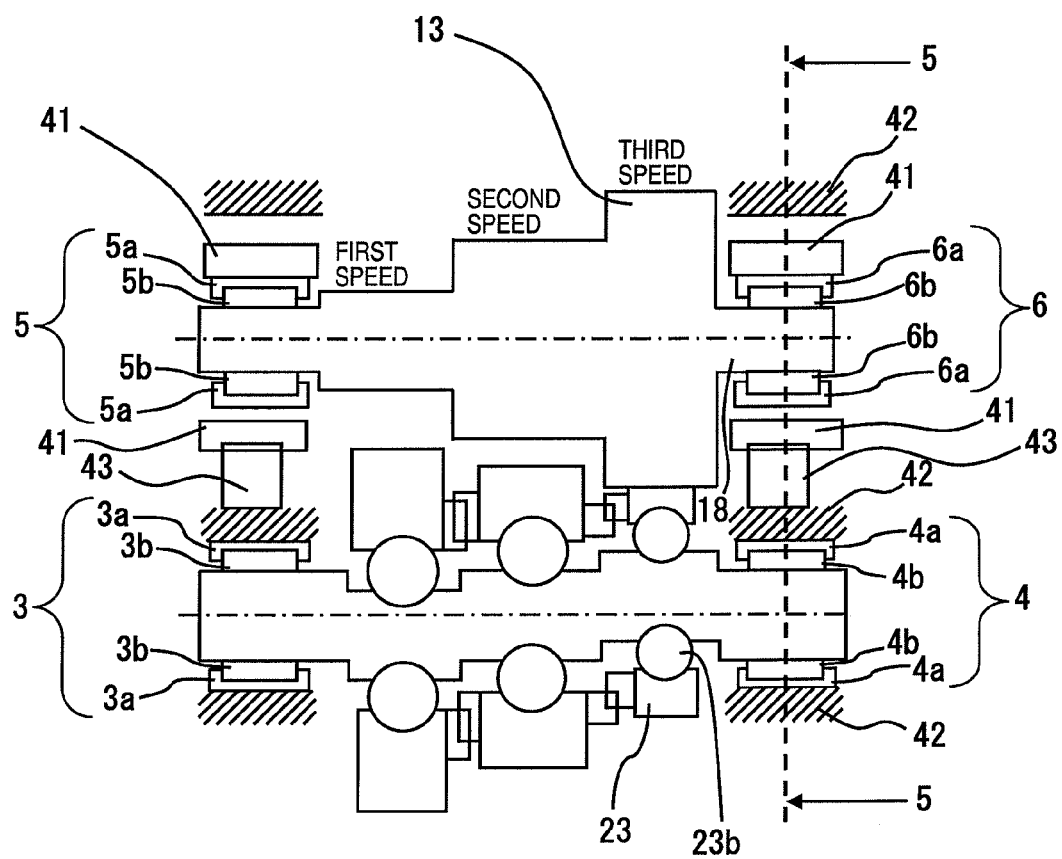
FIG. 4 is a simplified schematic diagram of an entire frictional drive transmission in accordance with a second embodiment having three forward speeds and one reverse speed.
Figure 5:
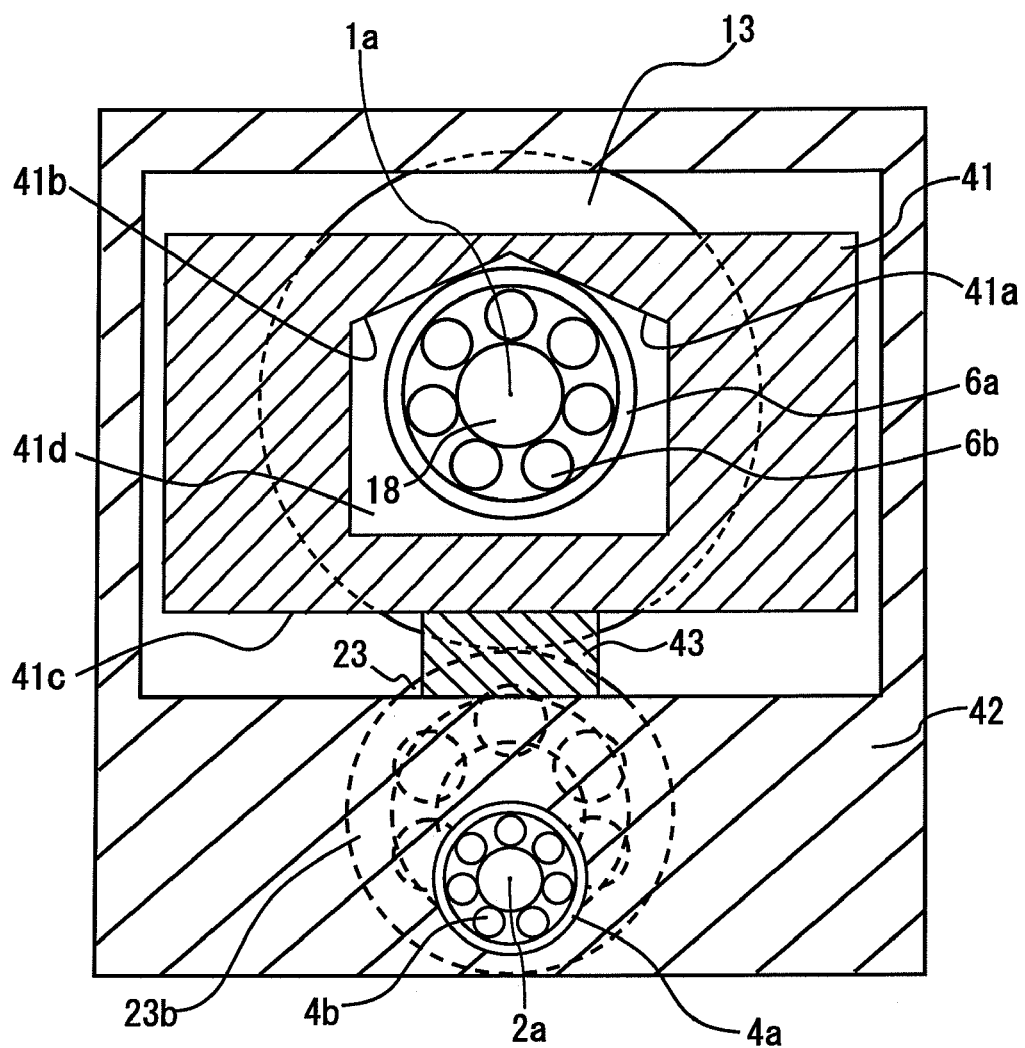
FIG. 5 is a simplified schematic cross sectional view, similar to FIG. 2, taken along section line 5-5 of FIG. 4 to illustrate a part of the frictional drive transmission in accordance with the second embodiment.

Referring now to FIGS. 4 and 5, a frictional drive transmission in accordance with a second embodiment will now be explained. Although the explanation based on FIG. 5 only refers to the side where the drive roller support bearing 6 is located, the same constituent features exist on the side where the drive roller support bearing 5 is located. Basically, the frictional drive transmission of the second embodiment has been modified such that each side of the roller unit 1 includes a cam 41 and a portion of a frame 42 with a tension spring 43 operatively disposed therebetween to apply pressure to the rollers in a tension direction. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment have been omitted for the sake of brevity.

The shapes of the cams 41 are shown in FIG. 4, with the shapes being different than the shapes of the cams 8 shown in FIG. 1 (explained in more detail with reference to FIG. 5). The springs 43 are provided between the frame 42 and bottom surfaces 41c of the cams 41.

FIG. 5 is a cross sectional view taken along section line 5-5 of FIG. 4 and shows the constituent features of a frictional drive transmission in accordance with the second embodiment. As shown in FIG. 5, each of the cams 41 has an open section 41d in which is formed a forward rotation cam slanted surface 41a and a reverse rotation cam slanted surface 41b. The springs 43 (elastic members) are connected between the frame 42 and the bottom surfaces 41c of each of the cams 41. The bottom surfaces 41c constitutes "mounting surface" of the cams 41. The frame 42 supports the second support bearing 4 and allows movement of the cams 41 in the vertical direction while restricting movement of the cams 41 in the horizontal direction. Each of the springs 43 is arranged such that it is in an appropriately tensioned state when the applied pressure load acting between the contacting roller pair is set to an initial value. From this state, if the pressing force acting between the contacting roller pair changes, then the spring 43 can expand or contract in the pressing force direction. In other words, when the pressing force decreases, the spring 43 contracts and increases the pressing force. Meanwhile, when the pressing force increases, the spring 43 elongates and lowers the pressing force.

Since the springs 43 are installed between the cams 41 and the frame 42 along the pressing force direction, the second embodiment can achieve the same operational effects as the first embodiment.

Third Embodiment

Figure 6:
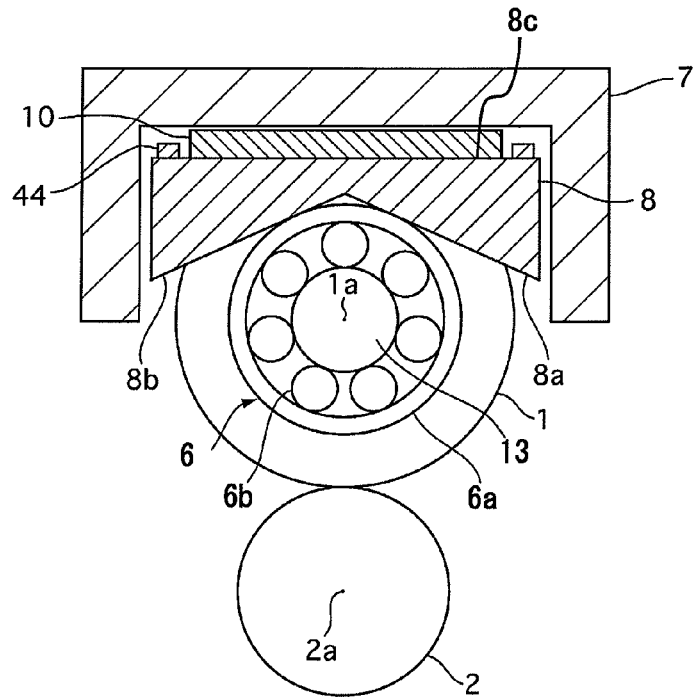
FIG. 6 is a simplified schematic end view of a part of the frictional drive transmission in accordance with a third embodiment.

Referring now to FIG. 6, a frictional drive transmission in accordance with a third embodiment will now be explained. Basically, the frictional drive transmission of the third embodiment has been modified to include a displacement limiting arrangement that serves to limit an amount of displacement of an elastic member acting between the frame and the cam 8. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment have been omitted for the sake of brevity.

Figure 7:
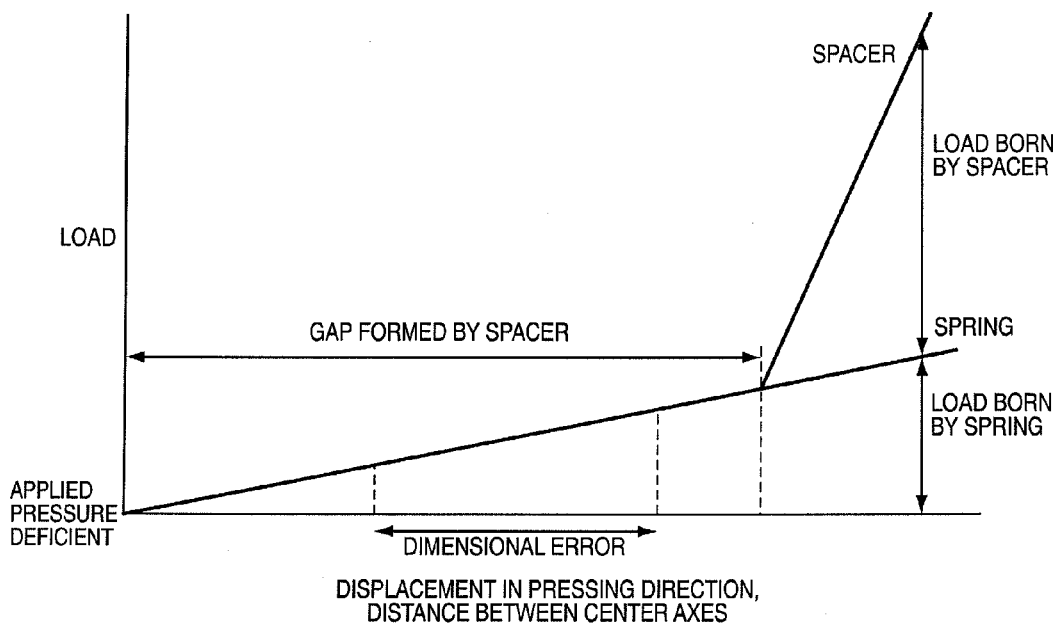
FIG. 7 is a graph that illustrates a relationship between a dimensional error and an amount of change in an applied pressure load and that shows the distribution of the applied pressure load born by the spring and by the spacer.

More specifically, as shown in FIG. 6, the frictional drive transmission in accordance with the third embodiment is provided with a spacer 44 that is arranged between each of the cams 8 and the frame 7 and aligned in a generally parallel fashion with respect to the springs 10. The spacers 44 constitute a displacement limiting arrangement for limiting compression of the springs 10. The spacers 44 have a higher rigidity than the springs 10 and are substantially ring shaped with a height dimension that is smaller than the height dimension of the springs 10. As shown in FIG. 7, the gaps between the spacers 44 and the frame 7 in the direction of the pressing force that acts on the contacting surfaces of the rollers is set to be larger than an estimated amount of dimensional variation of the distance between the center axes of the contacting roller pair.

The action of the third embodiment will now be explained. In a frictional drive transmission according to the third embodiment, the pressing force acting on the contacting surfaces of the rollers increases as the magnitude of the torque transmitted between the rollers increases. If the entire pressing force load were born by the elastic members (springs 10), then the elastic members would need to be configured to withstand larger loads. However, it is also necessary for the elastic members to have a low rigidity. The requirements of low rigidity and the ability to withstand large loads are in a trade off relationship and it is difficult to satisfy both of these requirements.

Figure 10:
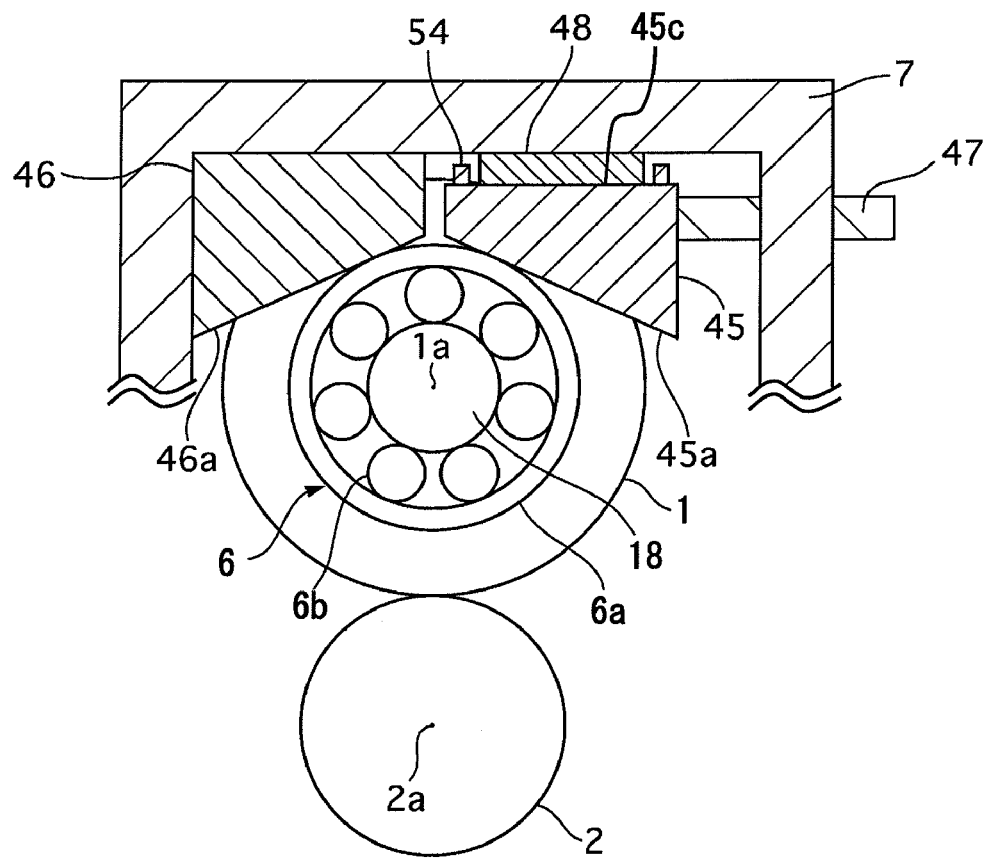
FIG. 10 is a simplified schematic cross sectional view, similar to FIG. 2, of a part of the frictional drive transmission in accordance with a sixth embodiment.

Therefore, in the third embodiment, the spacers 44 are provided to limit the amount of displacement of the springs 10. As shown in FIG. 10, the portion of a pressing force acting on the contacting surfaces of the rollers that is distributed to the spring 10 is held within the elastic deformation limit of the springs 10 and a pressing force that exceeds the elastic deformation limit of the springs 10 is distributed to the frame 7. As a result, the displacement can be reliably prevented from exceeding the elastic deformation limit of the springs 10.

When the pressing force acting on the contacting surfaces of the rollers increases, the springs 10 compress, and the spacers 44 contact the frame 7, the damage to the springs 10 can be reliably prevented because any additional load is born by the spacers 44.

Since the gaps between the spacers 44 and the frame 7 in the direction of the pressing force that acts on the contacting surfaces of the rollers is set to be larger than an estimated amount of dimensional variation of the distance between the center axes of the contacting roller pair, the amount of displacement of the springs 10 is ensured to be sufficient to absorb any change in the applied pressure load resulting from the dimensional variation of the distance between the center axes of the contacting roller pair and the spacers 44 is prevented from impeding the ability of the springs 10 to absorb changes in the applied pressure load.

The effects of the third embodiment will now be explained. In addition to the effects of the first embodiment, the frictional drive transmission in accordance with the third embodiment also exhibits the following effect. Damage to the springs 10 can be reliably prevented because the spacer 44 is provided which limits the displacement of the springs 10 to within the elastic deformation limit of the springs 10.

Fourth Embodiment

Figure 8:
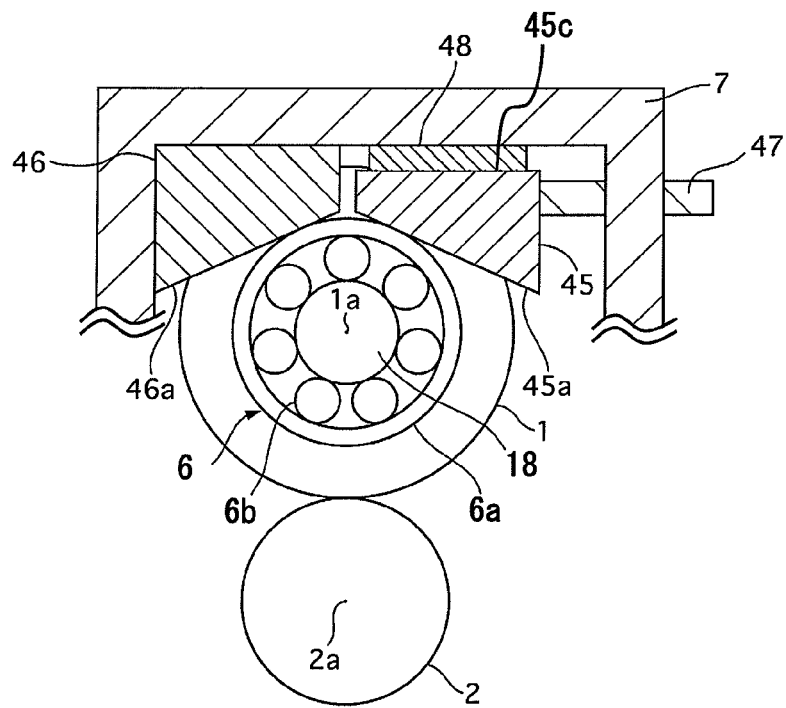
FIG. 8 is a simplified schematic cross sectional view, similar to FIG. 2, of a part of the frictional drive transmission in accordance with a fourth embodiment.

Referring now to FIG. 8, a frictional drive transmission in accordance with a fourth embodiment will now be explained. Although the explanation based on FIG. 8 only refers to the side where the drive roller support bearing 6 is located, the same constituent features exist on the side where the drive roller support bearing 5 is located. Basically, the frictional drive transmission of the fourth embodiment has been modified so that each end of the roller unit 1 includes a forward rotation cam 45, a reverse rotation cam 46, an applied pressure adjusting screw 47 and a spring 48. In this fourth embodiment, a pressure load is applied to the rollers along a direction perpendicular to the center axes of the rollers by pinching the drive roller support bearings between a pair of divided cam members. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment have been omitted for the sake of brevity.

More specifically, as shown in FIG. 8, each of the forward rotation cams 45 has a forward rotation cam slanted surface 45a that contacts the drive roller support bearing 5 and generates a pressing force when transmission transmits a forward torque (i.e., a torque oriented in the direction that causes the vehicle to move forward). Each of the reverse rotation cam 46 has a reverse rotation cam slanted surface 46a that contacts the drive roller support bearing 5 and generates a pressing force when transmission transmits a reverse torque (i.e., a torque oriented in the direction that causes the vehicle to move in reverse.

The reverse cams 46 are fixed to the frame 7 and the forward cams 45 are arranged such that they can be slid in the horizontal direction by the applied pressure adjusting screws 47, which are arranged to move to and fro in the horizontal direction. The springs 48 are installed between the upper surfaces 45c of the forward rotation cams 45 and the frame 7 along the pressing force direction. The upper surfaces 45c constitute "mounting surfaces" of the forward rotation cams 45.

The springs 48 are arranged such that it is in an appropriately compressed state when the position of the forward rotation cam 45 is adjusted such that the applied pressure load acting between a pair of rollers is set to an initial value. From this state, if the pressing force acting between the rollers changes, then, similarly to the first embodiment, the springs 48 can expand or contract in the pressing force direction. Although the explanation based on FIG. 5 only refers to the side where the drive roller support bearing 6 is located, the same constituent features exist on the side where the drive roller support bearing 5 is located.

The action of the fourth embodiment will now be explained. In the first embodiment, in order to adjust the applied pressure load, it is necessary to measure the dimensions of the parts in advance and select a spring having an appropriate shape (thickness) in view of the dimensions. Conversely, with a frictional drive transmission in accordance with the fourth embodiment, the applied pressure can be adjusted with the applied pressure adjusting screws 47 after the roller units 1 and 2 and the cams 45 and 46 are assembled to the frame 7. Furthermore, since the springs 48 can be put into a state in which it can expand and contract appropriately in advance when the applied pressure is adjusted, the work of assembling the transmission and adjusting the applied pressure load can be simplified.

Additionally, in the fourth embodiment, the applied pressure load can be adjusted by moving the forward rotation cams 45 with a small force. As explained in the first embodiment, if the angle of the cam slanted surface is $\alpha$, then, due to a wedge effect, the pressing force applied between the rollers is 1/tan α times larger than the load applied with the applied pressure adjusting screws 47.

Since the coefficient of friction of the rollers is approximately 0.1, α is approximately five degrees. Thus, the load to the rollers is at least 10 times greater than the load applied with the screws 47. In other words, the applied pressure between the rollers can be achieved by performing an operation that requires the application of a load that is only one tenth the size of the load obtained between the rollers. Thus, the pressure applied between the rollers can be adjusted appropriately without performing a highly accurate position adjustment.

The effects of the fourth embodiment will now be explained. In addition to the effects of the first embodiment, the frictional drive transmission in accordance with the fourth embodiment also exhibits the following effect. The reverse rotation cams 46 are fixed to the frame 7 and the forward rotation cams 45 are arranged such that they can be moved in the horizontal direction. The springs 48 are installed between the frame 7 and the upper surfaces 45*c* of the forward rotation cams 45. As a result, the applied pressure load can be achieved using a small force and the applied pressure can be adjusted appropriately without performing a highly accurate position adjustment.

Fifth Embodiment

Figure 9:
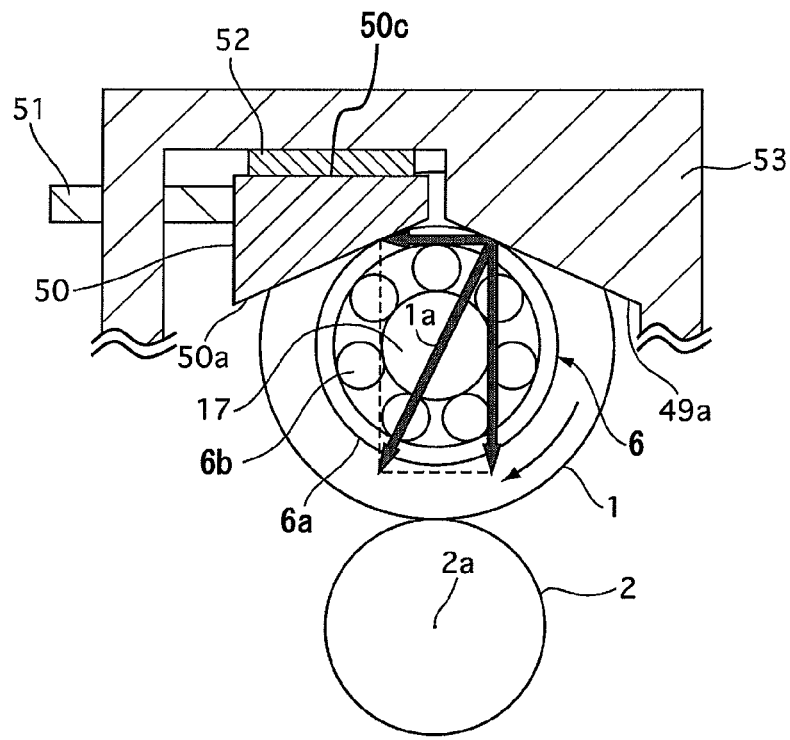
FIG. 9 is a simplified schematic cross sectional view, similar to FIG. 2, of a part of the frictional drive transmission in accordance with a fifth embodiment.

Referring now to FIG. 9, a frictional drive transmission in accordance with a fifth embodiment will now be explained. Although the explanation based on FIG. 9 only refers to the side where the drive roller support bearing 6 is located, the same constituent features exist on the side where the drive roller support bearing 5 is located. Basically, the frictional drive transmission of the fifth embodiment has been modified such that each side of the roller unit 1 includes a forward rotation cam slanted surface 49*a* fixed to a frame 53. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment have been omitted for the sake of brevity.

As shown in FIG. 9, in the frictional drive transmission in accordance with the fifth embodiment, the forward rotation cam slanted surfaces 49*a* are formed in the frame 53 and the reverse rotation cams 50 each having a reverse rotation cam surfaces 50*a* is arranged on the frame 53 such that it can be slid in a direction perpendicular to the direction of the pressing force acting at the contacting surfaces of the rollers by applied pressure adjusting screws 51 arranged to be moved to and fro in a direction perpendicular to the pressing force direction. Although in FIG. 9 the forward rotation cam slanted surfaces 49*a* are depicted as being formed as an integral part of the frame 53, it is also acceptable for a forward rotation cam to be provided as a separate member and fixed to the frame 53.

A spring 52 is installed between the upper surface 50*c* of each of the reverse rotation cams 50 and the frame 53 along the pressing force direction. The springs 52 are arranged such that they are in an appropriately compressed state when the position of the reverse rotation cams 50 are adjusted such that the applied pressure load acting between a pair of rollers is set to an initial value. From this state, if the pressing force acting between the rollers changes, then the springs 50 can expand or contract in the pressing force direction.

The action of the fifth embodiment will now be explained. Although providing a spring or other elastic member between the cam and the frame is advantageous from the standpoint of suppressing changes in the applied pressure load, the existence of the elastic member lowers the rigidity and can cause the driving feel to decline. More specifically, in the case of a frictional drive transmission in which the forward rotation cam slanted surface is supported with an elastic member, when the pressing force increases or decreases due to a change in torque, the amount of displacement that occurs with respect to the change in the load is large and, thus, the amount of translational displacement and torsional displacement of the rollers increases.

In the fifth embodiment, the forward rotation cam slanted surfaces 49*a* are formed integrally with the frame 53. Since the forward rotation cam slanted surfaces 49*a* are the cam slanted surface that acts when a forward torque exists, i.e., when an engine or other power source exerts a torque in order to move the vehicle forward, forming the forward rotation cam slanted surfaces 49*a* integrally with the frame 53 enable the torsional rigidity of the torque transfer from the drive roller unit 1 to the driven roller unit 2 during forward travel to be increased and the driving feel to be improved. Additionally, forming the forward rotation cam slanted surface integrally with the frame enables both the number of parts and the cost to be reduced in comparison with a structure in which a forward rotation cam is provided as a separate member.

The effects of the fifth embodiment will now be explained. In addition to the effects of the fifth embodiment and the fourth embodiment, a frictional drive transmission in accordance with the fourth embodiment also exhibits the following effect. Since the forward rotation cam slanted surfaces 49*a* are formed on the frame 53, the rigidity can be increased and the driving feel can be improved when the transmission transmits a forward torque. This is advantageous because forward torque is more often than negative torque.

Sixth Embodiment

Referring now to FIG. 10, a frictional drive transmission in accordance with a sixth embodiment will now be explained. Basically, the frictional drive transmission of the sixth embodiment is a combination of the third and fourth embodiments. In view of the similarity between the sixth embodiment and the prior embodiments, the parts of the sixth embodiment that are identical to the parts of the prior embodiments will be given the same reference numerals as the parts of the prior embodiments. Moreover, the descriptions of the parts of the sixth embodiment that are identical to the parts of the prior embodiments have been omitted for the sake of brevity.

In particular, the frictional drive transmission in accordance with a sixth embodiment is obtained by adding a spacer 54 to the fourth embodiment shown in FIG. 8. The spacer 54 is arranged between each of the forward rotation cams 45 and the frame 7 and aligned in a generally parallel fashion with respect to the springs 48. The spacers 44 have a higher rigidity than the springs 48 and are substantially ring shaped with a height dimension that is smaller than the height dimension of the springs 48. The gap between the spacers 54 and the frame 7 in the direction of the pressing force that acts on the contacting surfaces of the rollers is set to be larger than an estimated dimensional variation of the distance between the center axes of the contacting roller pair (see FIG. 7).

A frictional drive transmission in accordance with the sixth embodiment can achieve the same effects as the first, third, and fourth embodiments.

Seventh Embodiment

Figure 11:
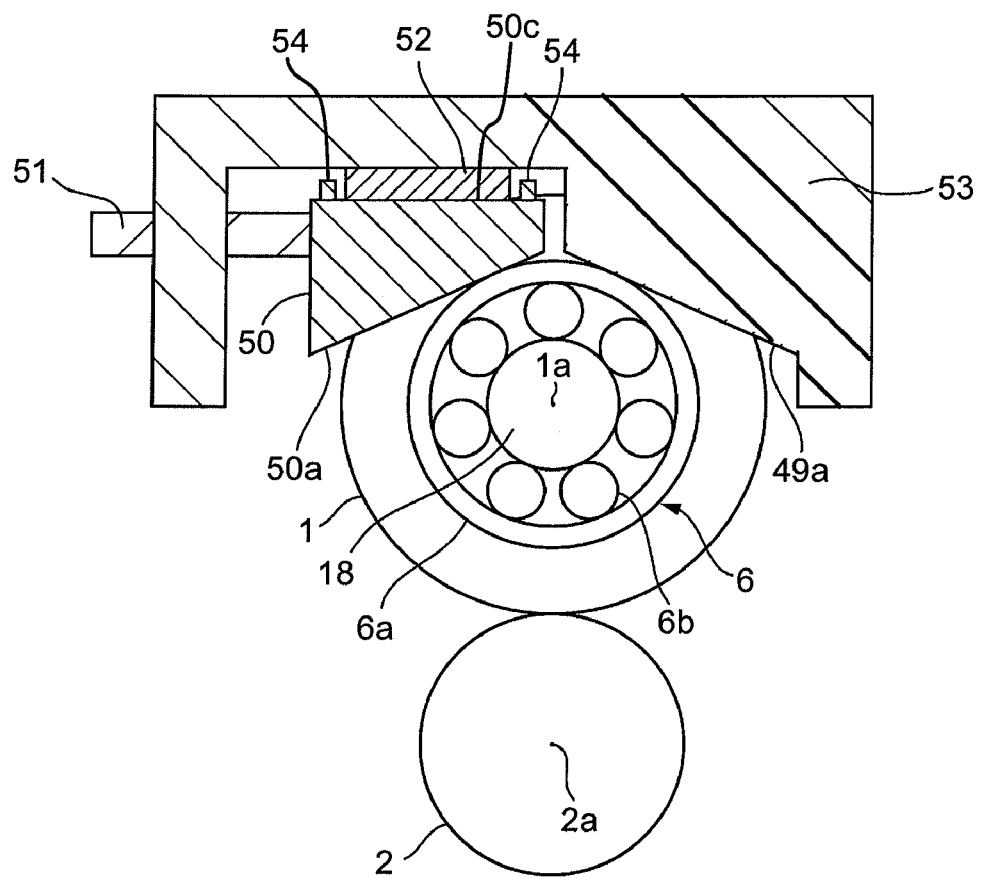
FIG. 11 is a simplified schematic cross sectional view, similar to FIG. 2, of a part of the frictional drive transmission in accordance with a seventh embodiment.

Referring now to FIG. 11, a frictional drive transmission in accordance with a seventh embodiment will now be explained. Basically, the frictional drive transmission of the seventh embodiment is a combination of the third and fifth embodiments. In view of the similarity between the seventh embodiment and the prior embodiments, the parts of the seventh embodiment that are identical to the parts of the prior embodiments will be given the same reference numerals as the parts of the prior embodiments. Moreover, the descriptions of the parts of the seventh embodiment that are identical to the parts of the prior embodiments have been omitted for the sake of brevity.

FIG. 11 shows a configuration obtained by adding a spacer 54 to each end of the frictional drive transmission of the fifth embodiment. This configuration can achieve the same effects as the first, third, and fifth embodiments and results in the most efficient frictional drive transmission.

The frictional drive transmissions disclosed herein are not limited to speed adjusting devices and transmissions for vehicles. Instead, it can be used in a wide variety of industrial and other equipment applications requiring an acceleration function, a deceleration function, or a speed shifting function. In such applications, the same operational effects as described in the first to seventh embodiments can be achieved.

Although the embodiments present examples in which a frictional drive transmission is applied to a three speed transmission device, the present invention can also be applied to transmission devices having four speeds, five speeds, or seven or more speeds. Although in the embodiments the support bearings of the driven roller are fixed to the frame and the support bearings of the drive roller are provided with a cam and a spring, it is also acceptable for the support bearings of the driven roller to comprise a cam follower and needles and be provided with a cam and a spring and for the support bearings of the drive roller to be fixed to the frame. It is also acceptable for each of the support bearings of both the driver roller and the driven roller to comprise a cam follower and needles and be provided with a cam and a spring.

Also, it is acceptable to combine the constituent features of the fourth and fifth embodiments. The elastic member is not limited to a spring and can be made of rubber or some other elastic material. When a spring is used, the type of spring can be any type of spring, including a coil spring or a flat spring.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A frictional drive transmission comprising:
a transmission case including a first support member and a second support member;
a drive roller unit including a plurality of drive rollers having different diameters, with the drive rollers being rotatably supported on the transmission case by the first support member;
a driven roller unit including a plurality of driven rollers having different diameters, with the driven rollers being rotatably supported on the transmission case by the second support member and each of the driven rollers being associated with a corresponding one of the drive rollers to form a plurality of roller pairs;
a gear shifting mechanism operatively coupled to one of the drive and driven roller units to selectively contact one of the roller pairs together to form a contacting roller pair,
at least one of the first and second support members including
a roller shaft support member supporting a shaft of one of the drive and driven roller units;
a cam-shaped support structure having a cam slanted surface and a mounting surface with the cam slanted surface being slanted with respect to a contact direction of the contacting roller pair to contact the roller shaft support member such that a pushing force is developed in the contact direction between the contacting roller pair and the mounting surface being arranged at an angle smaller than forty-five degrees with respect to the cam slanted surface; and
an elastic member arranged between the transmission case and the mounting surface to apply the pushing force in the contact direction of the contacting roller pair, with the elastic member biasing the mounting surface relative to the transmission case such that the mounting surface is movable in a direction parallel to the contact direction of the contacting roller pair relative to the transmission case.

2. The frictional drive transmission as recited in claim 1, wherein
the cam-shaped support structure includes a first cam-shaped support member arranged to contact the roller shaft support member when a positive torque exists, and a second cam-shaped support member arranged to contact the roller shaft support member when a reverse torque exists, with one of the first and second cam-shaped support members being fixed to the transmission case and the other cam-shaped support member being supported on the transmission case by the elastic member.

3. The frictional drive transmission as recited in claim 2, wherein
the first cam-shaped support member is fixed to the transmission case.

4. The frictional drive transmission as recited in claim 2, further comprising
an applied pressure adjusting member operatively arranged to adjust a position of the other of the first and second cam-shaped support members for applying a pressure to adjust the pushing force in the contact direction of the contacting roller pair.

5. The frictional drive transmission as recited in claim 2, wherein
the elastic member elastically supports the other of the first and second cam-shaped support members with respect to the transmission case such that the mounting surface of the other of the first and second cam-shaped support members is prevented from directly contacting the transmission case.

6. The frictional drive transmission as recited in claim 1, further comprising
a spacer arranged to limit a displacement amount of the elastic member to a prescribed amount.

7. The frictional drive transmission as recited in claim 1, wherein
the mounting surface is located between center axes of the rollers forming the contacting roller pair; and
the elastic member is arranged between the transmission case and the mounting surface in a pre-tensioned state.

8. The frictional drive transmission as recited in claim 1, wherein
the mounting surface is located farther to an outside position than a position between center axes of the rollers forming the contacting roller pair; and
the elastic member is arranged between the transmission case and the mounting surface in a pre-compressed state.

9. The frictional drive transmission as recited in claim 1, wherein
the elastic member elastically supports the cam-shaped support structure with respect to the transmission case such that the mounting surface of the cam-shaped support structure is prevented from directly contacting the transmission case.

* * * * *